C. REGENBOGEN & P. A. RITTER.
CYLINDER FOR INTERNAL COMBUSTION ENGINES.
APPLICATION FILED DEC. 24, 1913.
1,156,312.
Patented Oct. 12, 1915.
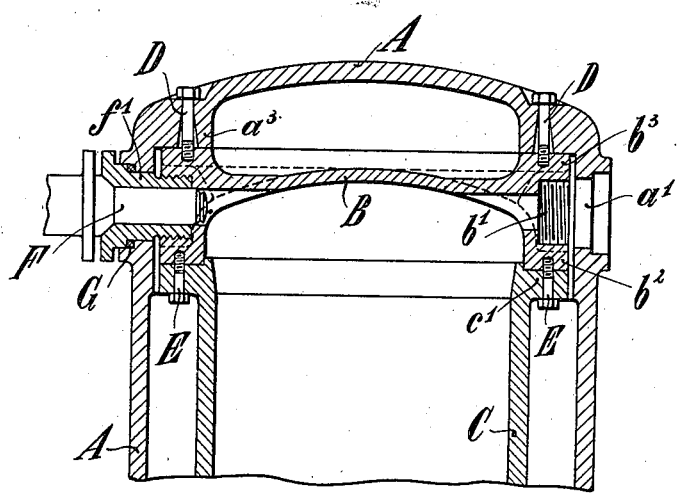

UNITED STATES PATENT OFFICE.

CONRAD REGENBOGEN AND PAUL ALEXANDER RITTER, OF KIEL, GERMANY.

CYLINDER FOR INTERNAL-COMBUSTION ENGINES.

1,156,312.   Specification of Letters Patent.   Patented Oct. 12, 1915.

Application filed December 24, 1913. Serial No. 808,590.

*To all whom it may concern:*

Be it known that we, CONRAD REGENBOGEN and PAUL ALEXANDER RITTER, citizens of the German Empire, both residing at Kiel, Germany, have invented certain new and useful Improvements in Cylinders for Internal-Combustion Engines, of which the following is a specification.

In internal combustion engines, that part of the cylinder which surrounds the combustion chamber sometimes suffers very severe strains, which it is not capable of withstanding particularly when the necessary valves are arranged in the cylinder wall, that is to say when the wall is interrupted at this part. It would of course appear reasonable, to specially strengthen the cylinder wall at the part where the combustion chamber is, but this proceeding does not however attain the desired result, as with such specially strongly constructed walls, the expansion and contraction thereof which is caused by the great fluctuations of pressure and temperature which arise do not permit of satisfactory working. On the contrary experience has shown that if this proceeding is adopted, fine cracks easily arise which rapidly become larger and jeopardize the cylinder all the more.

Now the object of this invention is to obviate this disadvantage.

The invention is illustrated in the drawing, in which the upper part of the cylinder of a vertical internal combustion engine is shown in vertical section.

The cylinder comprises a cylinder jacket A, closed at the top, an inner cap-shaped cover B, the cylindrical wall portion of which is continued down over the combustion chamber, and the liner C within which works the piston, which is not shown. The cylinder jacket A and the liner C are formed of cast iron, while the cap-like cover B may conveniently be made of a specially strong material, such as wrought iron, steel or the like. The cover B has two annular flanges $b^2$ $b^3$ and is inserted in the jacket A so as to be allowed play in a radial direction. The annular flange $b^3$ bears against an annular flange $a^3$ on the cylinder jacket A and transmits, during the working of the engine, the forces which arise in the interior of the cylinder to the cylinder jacket A. It is connected to the latter by screws D. The lower annular flange $b^2$ is rigidly connected to the annular flange $c^1$ of the liner C by screws E. The construction of the cylinder is so arranged in the manner known *per se*, that the liner C is capable of sliding in an axial direction inside the cylinder jacket A. The necessary valves F are arranged in borings $a^1$ $b^1$ formed in the cylinder jacket A and cover B respectively, and the glands $f^1$, of the valves F are screwed into the borings $b^1$ in the cover B, while they are movable in the direction of their axes in the borings $a^1$ in the jacket A and are packed by means of packing G. During the working of the engine the cover B can expand in an axial direction, the valves F moving in the borings $a^1$. Owing to its connection with the liner C the cover B can also move in a radial direction.

By means of the above described arrangement and construction of the cover B, a considerable advantage is obtained in a double respect. Firstly, that the part of the engine cylinder which is liable to be most severely strained and most subject to destruction, under the action of the high pressure and the great differences of heat, is enabled to expand unimpeded so that strains which would jeopardize the cylinder cannot easily arise. On the other hand the cover B surrounding the combustion chamber may, owing to its simple formation be made of specially strong material by casting, forging or pressing, so that the highest requirements in respect of strength may be provided in the above described cylinder, at a comparatively low cost of manufacture.

We claim:

1. A cylinder for internal combustion engines having a closed, surrounding jacket with an integral head and a liner therein; an interchangeable cap-shaped cover attached to the liner and removable therewith while so attached, said cover surrounding the combustion chamber which cover is capable of expanding freely together with said liner both in an axial and a radial direction within said jacket.

2. A cylinder for internal combustion engines having a closed, surrounding jacket with an integral head and a liner therein; an interchangeable cap-shaped cover attached to the liner and removable therewith while so attached, said cover surrounding the combustion chamber which cover is capable of expanding freely together with said liner both in an axial and a radial direction within said jacket; the cover being made of specially strong material such as wrought iron, steel or the like by forging, casting or pressing.

3. A cylinder for internal combustion engines having a closed, surrounding jacket and a liner therein; an interchangeable cap-shaped cover detachably connected to said liner and surrounding the combustion chamber which cover is capable of expanding freely both in an axial and a radial direction within said jacket, valves opening into the combustion chamber, the seats of said valves being rigidly connected to the cover while they pass through the cylinder jacket in a manner which permits of a sliding movement relative to said jacket.

4. A cylinder for internal combustion engines having a closed, surrounding jacket and a liner therein; an interchangeable cap-shaped cover surrounding the combustion chamber and situated intermediate said liner and jacket which cover is capable of expanding freely both in an axial and a radial direction within said jacket, the cap-shaped cylinder cover being provided with two annular flanges, one of which serves to connect the cover to the liner, and the other for the transmission of stresses to the cylinder jacket.

In testimony whereof we have affixed our signatures in presence of two witnesses.

CONRAD REGENBOGEN.
PAUL ALEXANDER RITTER.

Witnesses:
JULIUS ROPKE,
KARL FRIEDRICH FRENTZEL.